Sept. 11, 1962  A. ABOLINS ET AL  3,052,941
HORIZONTAL CONTAINER COUPLERS
Filed March 2, 1959  4 Sheets-Sheet 1

INVENTORS.
ANDREW ABOLINS
ROBERT A. HITCH
BY Max R. Millman
ATTORNEY.

Sept. 11, 1962  A. ABOLINS ET AL  3,052,941
HORIZONTAL CONTAINER COUPLERS
Filed March 2, 1959  4 Sheets-Sheet 2
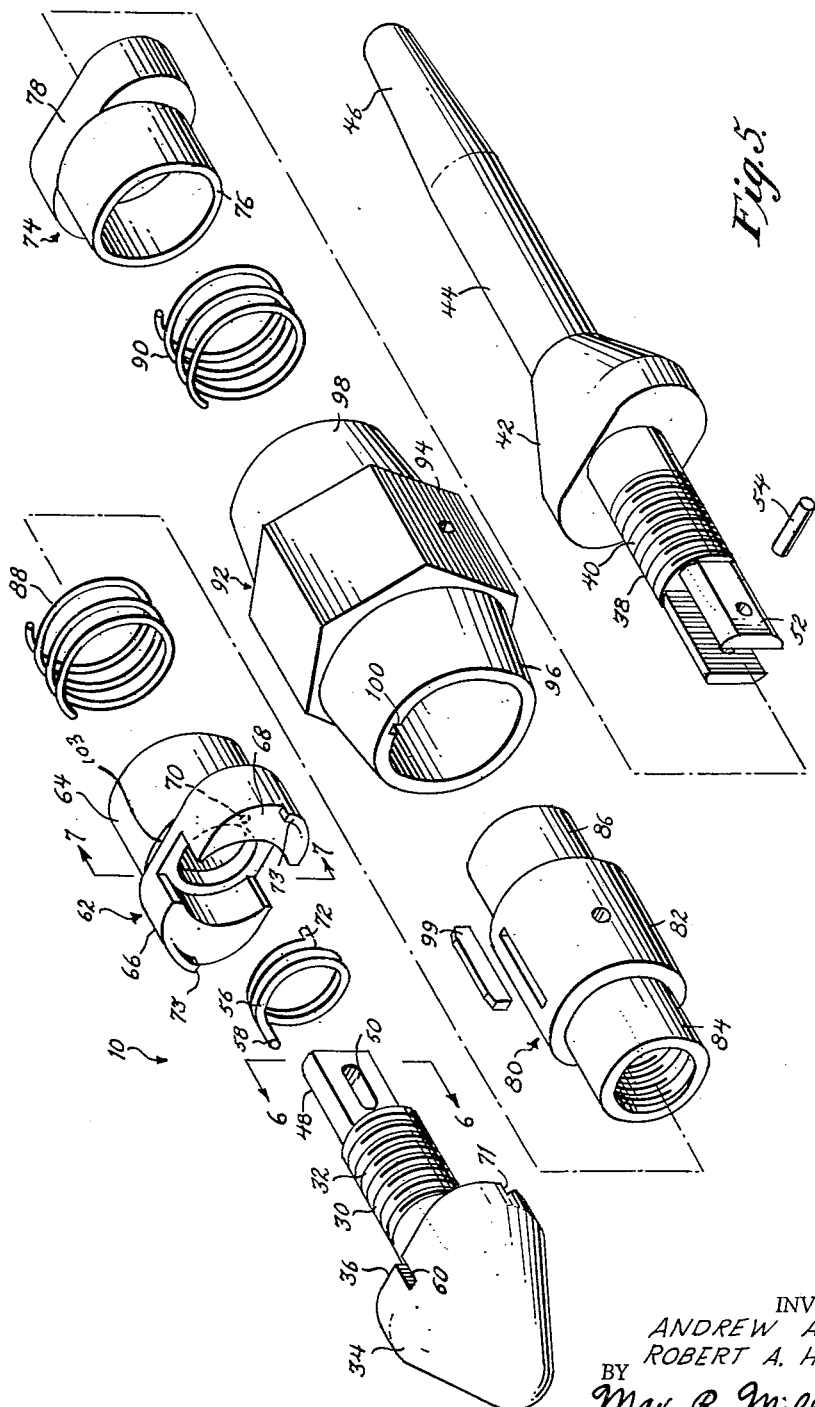
INVENTORS.
ANDREW ABOLINS
ROBERT A. HITCH
BY Max R. Millman
ATTORNEY.

Sept. 11, 1962  A. ABOLINS ET AL  3,052,941
HORIZONTAL CONTAINER COUPLERS
Filed March 2, 1959  4 Sheets-Sheet 3
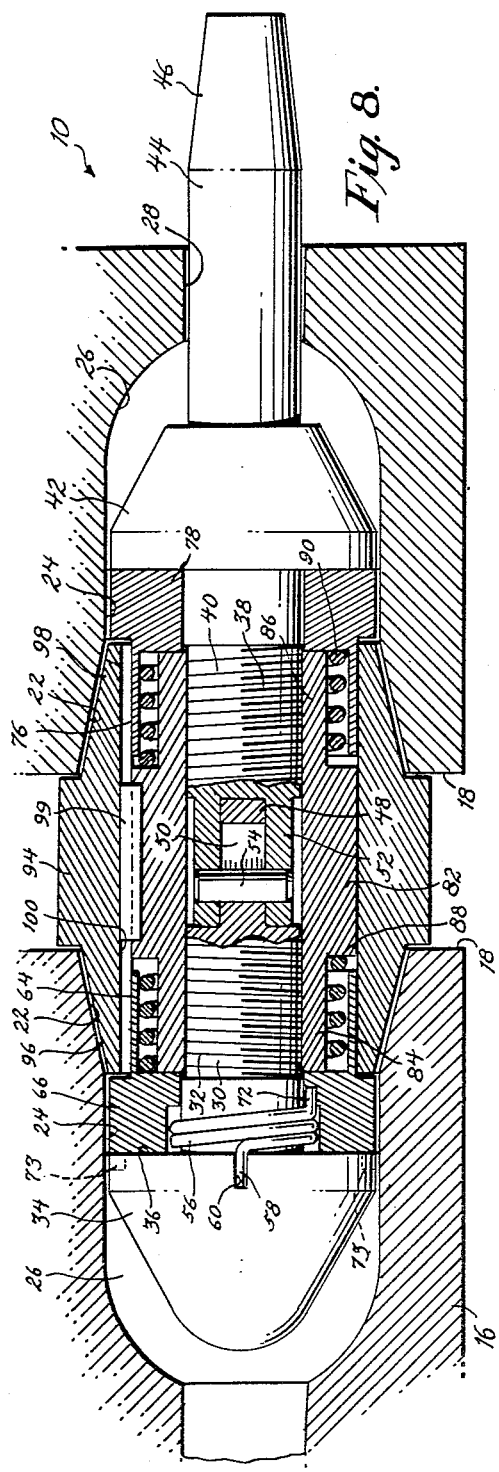
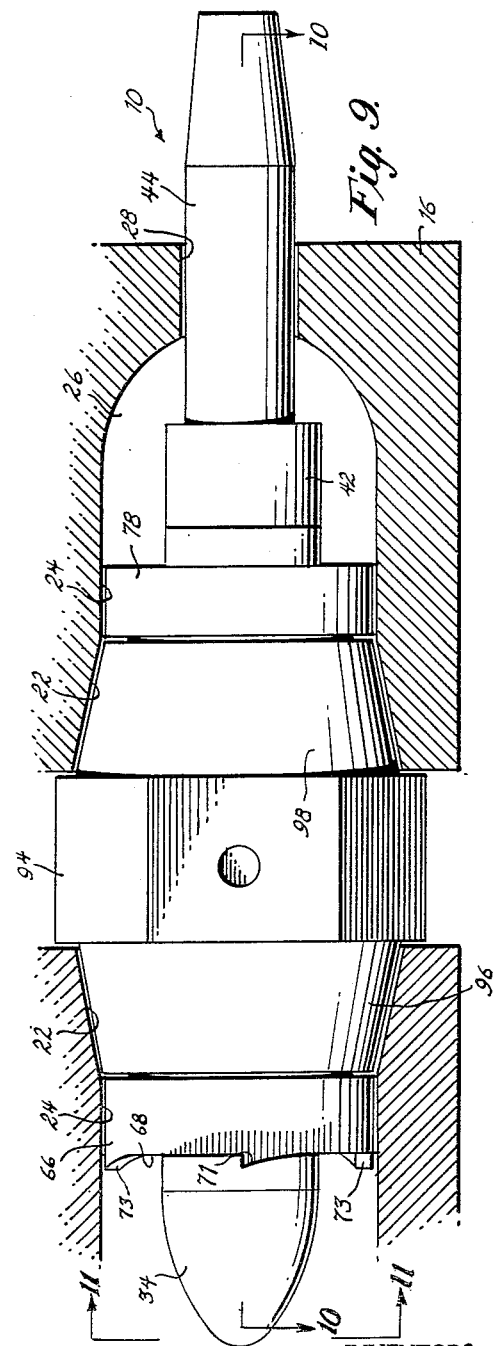
INVENTORS.
ANDREW ABOLINS
ROBERT A. HITCH
BY Max R. Millman
ATTORNEY.

INVENTORS.
ANDREW ABOLINS
ROBERT A. HITCH
BY May R. Millman
ATTORNEY.

United States Patent Office
3,052,941
Patented Sept. 11, 1962

1

3,052,941
HORIZONTAL CONTAINER COUPLERS
Andrew Abolins, Penndel, Pa., and Robert A. Hitch, Milford, N.J., assignors to Strick Trailers, Philadelphia, Pa., a division of Fruehauf Trailer Co., a corporation of Michigan
Filed Mar. 2, 1959, Ser. No. 796,698
11 Claims. (Cl. 24—221)

This invention relates to coupling mechanisms which are particularly adapted for use with containerized cargo, the modern trend in freight haulage.

An advanced form of containerized cargo is the method of hauling freight by ship, rail or air, wherein the shipping container itself is a trailer body demountable from its running gear, the same when laden with cargo attaining a gross weight in the many thousands of pounds. It is economically advantageous frequently to couple two trailer bodies, such as 17 foot bodies and lift the coupled bodies as a unit into the hold of or onto the deck of a ship, onto a railroad flat car or onto a flat bed trailer. It is manifest that, since the coupled bodies when laden with cargo are very heavy, tensional and shear forces are transmitted to the means coupling the bodies not only during the lifting operation but also during the transportation thereof, as when the ship pitches, or the vehicle transporting the containers rides on slopes or suddenly starts and stops.

The primary object of the invention is to provide means for horizontally coupling containers which are capable of transmitting great tensional and shearing forces and which at the same time occupy only a minimum of space.

Another object of the invention is to provide horizontal couplers for containers which are easy to mount upon the containers and which are automatically snapped into positive coupling positions in response to a predetermined movement of one container relative to the other.

Another object of the invention is to provide horizontal couplers for containers which are horizontally adjustable and easy to operate manually both for the coupling and uncoupling operations.

These and other objects of the invention will become more apparent as the following description proceeds in conjunction with the accompanying drawings, wherein:

FIGURE 5 is an exploded perspective view of the coupler;

FIGURE 8 is a vertical sectional view through the assembled coupler when inserted in the container slots or sockets but not locked therein;

FIGURE 9 is a vertical sectional view, partly in elevation, of the assembled coupler as shown in FIGURE 9 but in the locked position;

2

Figure 12:
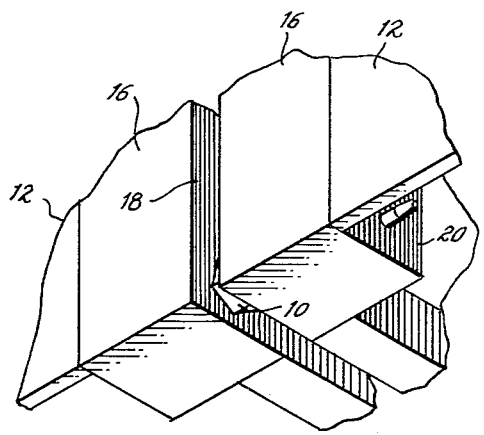
Figure 10:
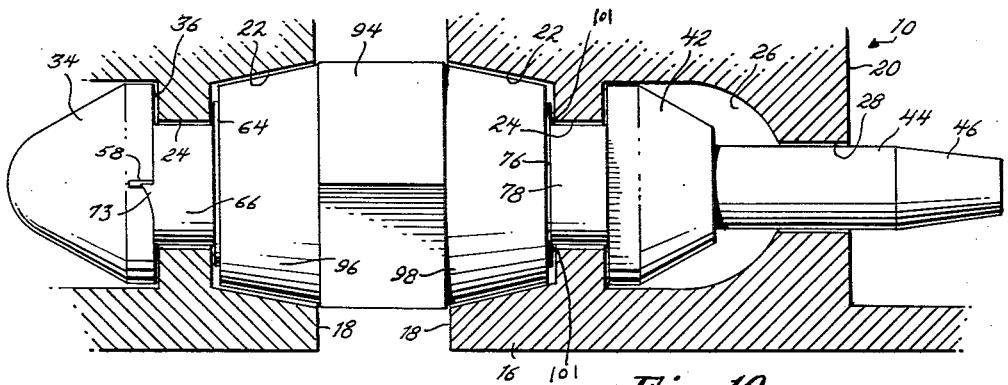
Figure 11:
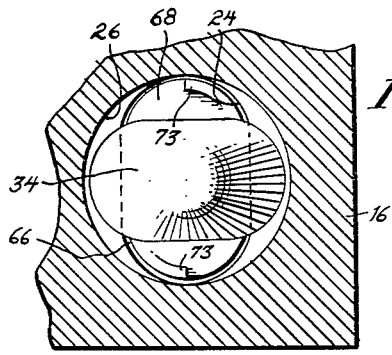
Figure 13:
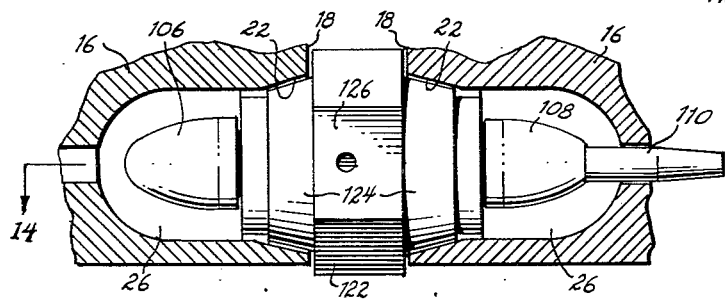
Figure 14:
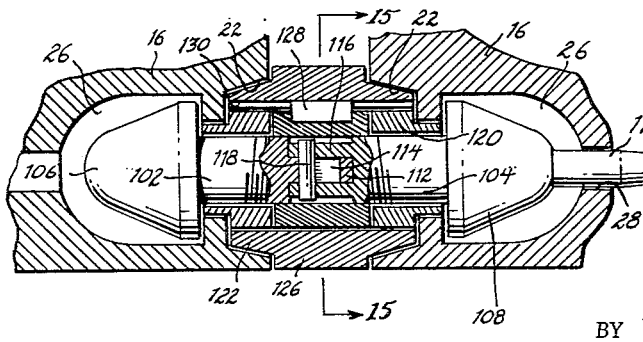

FIGURE 10 is a sectional view, partly in elevation, taken on the line 10—10 of FIGURE 9;

FIGURE 11 is a sectional view taken on the line 11—11 of FIGURE 9 showing the inside of the slot or socket of the container;

FIGURE 12 is a fragmentary perspective view taken below the lower corners of coupled containers;

FIGURE 13 is a vertical sectional view, partly in elevation, of another form of the coupler;

FIGURE 14 is a sectional view taken on the line 14—14 of FIGURE 13; and

Figure 15:
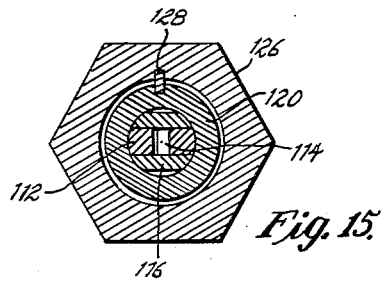

FIGURE 15 is a sectional view taken on the line 15—15 of FIGURE 14.

Specific reference is now made to the drawings wherein similar reference characters are used for corresponding elements throughout.

Figure 1:
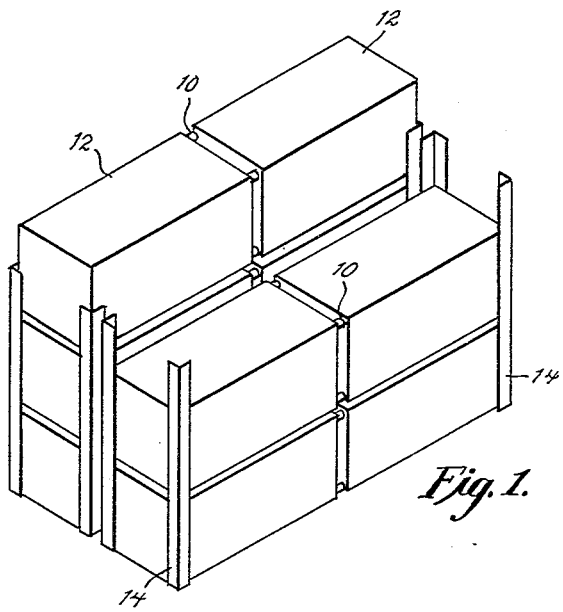
FIGURE 1 is a diagrammatic perspective view of containers in the hold of a ship horizontally coupled with the means of the instant invention.
Figure 2:
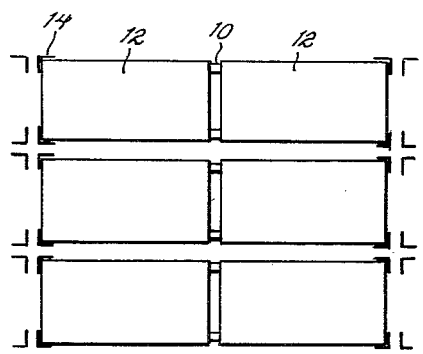
FIGURE 2 is a plan diagrammatic view thereof.
Figure 3:
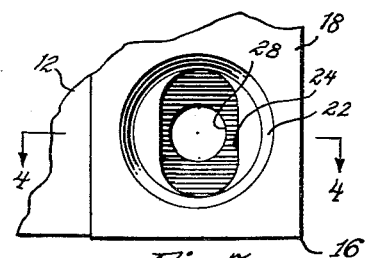
FIGURE 3 is an end elevational view of a typical slot or socket in the corner portion a container or trailer body.
Figure 6:
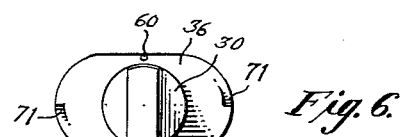
FIGURE 6 is a sectional view taken on the line 6—6 of FIGURE 5.
Figure 7:
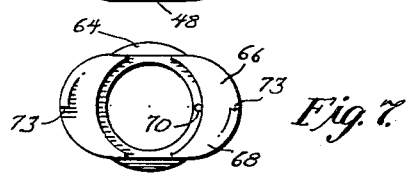
FIGURE 7 is a sectional view taken on the line 7—7 of FIGURE 5.
Figure 4:
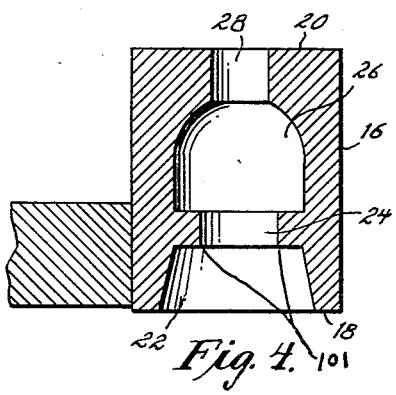
FIGURE 4 is a sectional view taken on the line 4—4 of FIGURE 3.

The present horizontal coupler is generally indicated at 10 and is used to couple the corners of containers, such as trailer bodies 12. When coupled the containers are lifted by a suitable mechanism (not shown) as a unit either from the trailer running gear or from a freight storage depot and placed into the hold of a ship equipped with vertical spacer beams 14 or onto the deck of a ship or onto a railroad flat car as desired. As shown more particularly in FIGURES 3, 4 and 12, each container includes a corner piece or casting 16 having opposed inner and outer vertical wall surfaces 18 and 20. Opening through the inner vertical wall surface 18 is a tapered recess 22 which communicates with an elongated slot 24 which in turn communicates with a further enlarged generally rounded recess 26 that also communicates with a bore 28 which opens through the opposed wall surface 20.

Coming now to the coupler itself, the same comprises the elements clearly shown in FIGURE 5. A rod 30 is provided having left hand threads 32 over its major length and an enlarged tapered head 34 at its outer end, the maximum length of said head being somewhat less than that of the corner slot 24 and greater than the width thereof. Adjacent the head, the rod is free of threads, the head thereat having a substantially planar face 36. A second rod 38 is provided having right hand threads 40 thereon and a tapered head 42 of substantially the same size and shape as the head 34. The second rod 38 has a portion 44 which extends beyond the head 42 and terminates in a taper 46. The inner end of the first rod 30 has an axially extending tongue 48 with an elongated slot 50 therethrough which is received between the arms of a yoke 52 on the inner end of the second rod 38, there being a pin 54 which extends through the yoke and the slot 50 of the tongue 48 whereby the rods are joined at their inner ends and are capable of limited relative longitudinal or axial movement towards and away from each other.

Embracing the smooth portion of the first rod 30 adjacent the head 34 is a torsion spring 56 having an axially extending portion 58 which engages an open notch 60 at a predetermined position in the head 34. A cocking member 62 is provided having a generally cylindrical portion 64 and an enlarged filler portion 66 whose horizontal cross-section is substantially the same as the maximum horizontal cross-section of the head 34, said portion 66 being adapted to extend into the slot 24 after the head 34 has entered the recess 26 in the corner casting 16. Said filler portion 66 of the cocking member has a wall surface 68 which faces the planar face 36 of the head and in which a hole 70 is drilled for receiving the other terminal axially extending portion 72 of the torsion spring 56. In the relaxed position of the torsion spring 56, the head 34 is in a coupling position transverse of the corner casting slot 24 and the filler portion 66, as shown in FIGURE 11.

A latching mechanism is provided releasably connecting said cocking member 62 to said head 34 when the head and said filler portion 66 are aligned, the same comprising one or more notches 71 cut into the planar face 36 of the head 34 and one or more ratchets or cam fingers 73 extending from the face 68 of the filler portion 66. It will be seen that the torsion spring 56 can be loaded up by rotating the cocking member 62 in a direction clockwise to the position of said cocking member as viewed in FIG. 5.

At the other end of the coupler, a second member 74 is provided having a cylindrical portion 76 and an elongated portion 78 of horizontal cross-section substantially the same as the previously-mentioned filler portion 66 of the cocking member 62, said portion 78 being adapted to enter the slot 24 of the adjacent container corner member.

A turnbuckle member 80 of generally cylindrical shape has an enlarged central portion 82 and reduced end portions 84 and 86 which extend through the portions 64 and 76 of the members 62 and 74, said end portions 84 and 86 having internal left and right hand threads receiving the threaded rods 30 and 38 respectively. A coil spring 88 is wound about the end portion 84 of the turnbuckle member and terminally bears against the central portion 82 and the filler portion 66 of the cocking member 62 urging the latter towards the head 34. Similarly, there is a coil spring 90 which is wound about the other end portion 86 of the turnbuckle member, the spring terminally bearing on the central portion 82 and on the elongated portion 78 of the member 74, urging the latter towards the other coupling head 42.

Embracing the turnbuckle member 80 and the cylindrical portions 64 and 76 of the members 62 and 74 is a shearing collar 92. The collar includes a central enlarged portion 94 with preferably planar faces and reduced end portions 96 and 98 preferably tapered to conform and fit into the tapered recesses 22 in the corner pieces 16 of opposed containers 12 to be coupled, the end portions 96 and 98 covering the cylindrical portions 64 and 76 of the members 62 and 74. The shearing collar 92 is operatively connected to the turnbuckle member 80 by a key 99 upstanding from the central portion 82 which is received in a groove 100 extending along the length of the shearing collar. Thus the shearing collar is rotatable with the turnbuckle member but movable longitudinally relative thereto.

In use, with the parts assembled as shown in the drawings, the cocking member is rotated so that the fingers 73 engage the notches 71 in the head thereby placing a load on the torsion spring 56 and retaining the heads 34 and 42 in aligment with each other and the filler portions 66 and 78. The position of the turnbuckle member 80 is such that the the inner ends of the coupling rods 30 and 38 are furthest apart. The coupling member is then mounted on one of the corner castings 16 by inserting the extension 44 on the rod 38 through the bore 28 of the corner casting until the head 42 is located in the rounded recess 26, the filler portion 78 is engaged in the elongated slot 24 and the end portion 98 of the shearing collar is seated in the tapered recess 22 of the corner casting, in which position the coupling member is supported in a generally horizontal position. The second container is then moved towards the first container until the head 34 enters the recess 26 of the second container, the filler portion 66 enters the slot 24 of said second container and the end portion 96 of the shearing collar seats in the tapered recess 22 of said second container.

Further continued movement of the second container towards the first causes the edges 101 of elongated slot 24 in the corner casting 16 to bear on the shoulders 103 of the cocking member 62, which transmits a longitudinal force on the cocking member, compressing spring 88 and releasing the latch fingers 73 from the notches 71 in the head 34, whereupon the torsion spring 56 takes over and snaps the joined heads 34 and 42 to the coupling position transverse of the corner casting slots 24 and the filler portions 66 and 78 respectively. A tool is then applied to the shearing collar 92 to turn the same, whereupon the ends of the rods 30 and 38 are drawn together to their innermost position and the containers are firmly coupled.

When the coupled containers are transported, tensional forces are transmitted through the rods 30 and 38 and the turnbuckle 80; the shearing forces through collar 92. To uncouple the containers, the shearing collar is reversely rotated, thereby moving the ends of the rods apart until the pin 54 engages the end of the slot 50 in the tongue 48. Further continued rotation of the shearing collar will now rotate the rods and the heads into alignment with the filler portions 66 and 78, whereupon the fingers 73 will re-engage the notches 71 in the head 34. The containers can now be moved apart.

The coupler shown in FIGURES 13–15 is a completely manually operable variation of the aforementiond coupler and hence, although simpler, does not have the many advantages residing in the semi-automatic coupler. It consists of a pair of horizontal rods 102 and 104 with left and right hand threads and enlarged tapered heads 106 and 108 at their ends of the same shape and dimensions of the previously described heads 34 and 42, the rod 104 also having an extension 110 beyond the head 108 adapted to extend through the corner casting bore 28 to support the coupler prior to the coupling operation. The inner ends of the rods are joined by a means permitting limited longitudinal movement of the rods relative to each other. This means includes a tongue 112 extending from the rod 102 with an elongated slot 114 therein, a yoke or fork 116 on the end of the other rod 104 receiving said tongue, and a pin 118 extending through said yoke and slot.

Mounted on the rods is a generally cylindrical turnbuckle member 120 whose end portions are oppositely internally threaded to receive the rods. A shearing collar 122 is provided which embraces the turnbuckle member and includes tapered end portions 124 which are adapted to enter the tapered recesses 22 of the corner castings 16 and a central portion 126 having square portions adapted to be engaged by a turning tool. Upstanding from the turnbuckle member is a key 128 which is received in a longitudinal slot 130 in the shearing collar so that the latter and the turnbuckle member can rotate together yet the members are movable longitudinally of each other.

In use, the manual coupler is mounted on one of the containers by passing the extension 110 of the rod 104 into the bore 28 of the corner casting until the head 108 enters the recess 26 and the tapered end 124 of the shearing collar 122 enters the tapered recess 22. At this point the ends of the rods 102 and 104 are farthest apart. The other head 106 is then made to enter the corner casting of the second container until it is located in the recess 26 and the other tapered end portion 124 of the shearing collar has entered the tapered recess 22. Then the shearing collar is rotated, turning the heads 106 and 108 through friction force between threads in turnbuckle 120 and rods 102 and 104 until the heads traverse the corner casting slots 24 to effect coupling of the containers. Continued rotation of the collar will draw the rods 102 and 104 inwardly to their farthest positions to effect a firm coupling of the containers. Reverse operation will align the heads with the slots 24 and allow separation of the containers.

While preferred embodiments of the invention have here been shown and described, it will be understood that skilled artisans may make minor variations without departing from the spirit of the invention and the scope of the appended claims.

We claim:

1. A unit for coupling two members horizontally comprising a pair of couplers, each including a rod and an enlarged head thereon of elongated cross-section in a plane perpendicular to the axis of said rod, means joining the free ends of said rods and providing for longitudinal but non-rotational movement of the rods relative to each other, means operatively connected to said rods to effect said longitudinal movement, a torsion spring having one end connected to one of said heads, a cocking member rotatably mounted on one of said rods and of elongated cross-section in a plane perpendicular to the axis of said one rod, said cocking member being connected to the other end of said torsion spring, said torsion spring being relaxed when said heads are aligned in a predetermined coupling position and said cocking member traverses said heads, latch means operative between said cocking member and said one head applying a load on said torsion spring and releasably retaining said heads in an aligned about-to-couple position transverse of said predetermined coupling position and in alignment with said cocking member, and spring means operative on said cocking member urging said latch means into engagement with said one head.

2. The combination of claim 1 wherein said means joining the free ends of said rods includes a tongue extending longitudinally from the free end of one of said rods, said tongue having an elongated slot, a yoke on the free end of the other rod and receiving said tongue and a pin extending through said yoke and said slot in said tongue.

3. The combination of claim 1 wherein said means to move said rods longitudinally towards and away from each other is a turnbuckle.

4. The combination of claim 3 and a shear collar embracing said turnbuckle and keyed thereto for rotation therewith, said turnbuckle and shear collar being movable longitudinally relative to each other.

5. The combination of claim 1 wherein said latch means includes notches in said one head and cam fingers extending from said cocking member engageable in said notches when said torsion spring is loaded and said heads are aligned in said about to couple position.

6. A unit for coupling two members together horizontally comprising a pair of rods each having an enlarged head in a plane perpendicular to the axis of the rod, means operatively connected to the rods to move their free ends longitudinally towards and away from each other, a cocking member rotatably mounted on one of said rods and of elongated cross-section in a plane perpendicular to the axis of said one rod, a torsion spring terminally connected between one head and said cocking member, said torsion spring being relaxed when said heads are aligned in a predetermined coupling position and said cocking member traverses said heads, and latch means operative between said cocking member and said one head to apply a load on said torsion spring and releasably retain said heads in an aligned ready-to-couple position transverse of said predetermined coupling position and in alignment with said cocking member, wherein said means to move said rods longitudinally includes a turnbuckle, a shear collar and means keying said shear collar to said turnbuckle whereby said shear collar is rotatable with but movable longitudinally of said turnbuckle, said shear collar being adapted to bear against the members to be coupled when said unit is in the coupling position.

7. In combination with two members each having a vertical wall, an elongated slot therethrough and a recessed portion behind the slot, a unit for coupling the two members horizontally comprising a pair of couplers each including a rod and a head of elongated cross-section in a plane perpendicular to the axis of said rod, means operatively connected to the free ends of said rods to move them longitudinally towards and away from each other but restrain relative rotational movement between said rods, a cocking member rotatably mounted on one of said rods and of elongated cross-section in a plane perpendicular to the axis of said one rod, a torsion spring terminally connected to one of said heads and said cocking member, said heads extending through said slots and being disposed in said recessed portions of said members, said torsion spring being relaxed when said heads are in a predetermined coupling position transverse of said slots and said cocking member traverses said heads, and latch means operative between said cocking member and said one head applying a load on said torsion spring and releasably retaining said heads in an about to couple position in alignment with said slots and said cocking member but transverse of said predetermined coupling position, one of said rods including a portion beyond the head thereon extending through the recessed portion of one of said members to be coupled, said recessed portion including a wall and bore provided therein receiving the free end of said extended portion of said rod thereby supporting the coupling unit in a generally horizontal position in said one of said members to be coupled.

8. In combination with a pair of members each having a wall, an elongated slot therein and a recess therebehind, a unit to couple said members together comprising a pair of rods each having an enlarged head of elongated cross-section in a plane perpendicular to the axis of said rod, means joining the free ends of said rods and providing for longitudinal but non-rotational movement of said rods relative to each other, means effecting said longitudinal movement, a cocking member of elongated cross-section in a plane perpendicular to the axis of and mounted rotatably on one of said rods, a torsion spring terminally connected to one of said heads and said cocking member, said heads, cocking member and elongated wall slots being in alignment when said torsion spring is loaded and in which condition said heads are disposed in said wall recesses and at least a portion of said cocking member is disposed in one of said wall slots and there restricted against rotation, and latch means operative between said cocking member and said one head to releasably hold said torsion spring under load whereby, when said latch means is released, said torsion spring causes said heads to rotate to a coupling position transverse of said wall slots and of said cocking member.

9. The combination of claim 8 wherein said latch means includes interengaging cam fingers on said one head and said cocking member and a spring urging said cocking member towards said one head.

10. The combination of claim 9 wherein said cocking member includes a shoulder disposed outside of said one wall slot whereby movement of the wall containing said one slot against said shoulder acts to release said latch means and permit said torsion spring to return to its relaxed position thereby turning said coupler heads to their coupling position transverse of said slots.

11. A unit for coupling two members horizontally comprising a pair of couplers, each including a rod and an enlarged head thereon of elongated cross-section in a plane perpendicular to the axis of said rod, means joining the free ends of said rods and providing for longitudinal but non-rotational movement of the rods relative to each other, means operatively connected to said rods to effect said longitudinal movement, a torsion spring having one end connected to one of said heads, a cocking member rotatably mounted on one of said rods and of elongated cross-section in a plane perpendicular to the axis of said one rod, said cocking member being connected to the other end of said torsion spring, said torsion spring being relaxed when said heads are aligned in a predetermined coupling position and said cocking member traverses said heads, and latch means operative between said cocking member and said one head applying a load on said torsion spring and releasably retaining said heads in an aligned about-to-couple position transverse of said predetermined coupling position and in alignment with said cocking member.

References Cited in the file of this patent

UNITED STATES PATENTS

| | | |
|---|---|---|
| 264,020 | Yakel | Sept. 5, 1882 |
| 503,116 | Beekman | Aug. 15, 1893 |
| 533,239 | Sinclair | Jan. 29, 1895 |
| 617,196 | Sinclair | Jan. 3, 1899 |
| 922,293 | Kirchner | May 18, 1909 |
| 1,681,381 | Tolman | Aug. 21, 1928 |
| 1,793,966 | Romine | Feb. 24, 1931 |
| 2,115,824 | McRorey | May 3, 1938 |
| 2,352,585 | Camburn | June 27, 1944 |
| 2,533,894 | Podell | Dec. 12, 1950 |
| 2,665,489 | Cunningham | Jan. 12, 1954 |
| 2,708,380 | Mais | May 17, 1955 |